United States Patent [19]
Clinton

[11] Patent Number: 5,865,317
[45] Date of Patent: Feb. 2, 1999

[54] WOODWASTE PROCESSING SYSTEM WITH CONTAMINATE SEPARATION

[75] Inventor: L. Powell Clinton, Nevada City, Calif.

[73] Assignee: Fuel Harvesters Equipment, Inc., Midland, Tex.

[21] Appl. No.: 761,188

[22] Filed: Sep. 16, 1991

Related U.S. Application Data

[63] Continuation of Ser. No. 414,950, Sep. 29, 1989, Pat. No. 5,074,992.

[51] Int. Cl.⁶ .................................................. F03B 7/00
[52] U.S. Cl. .......................... 209/12.1; 209/19; 209/37; 209/38; 209/44.1; 209/216; 209/234; 209/632
[58] Field of Search ................... 209/12.1, 19, 37, 209/38, 44.1, 216, 234, 632

[56] References Cited

U.S. PATENT DOCUMENTS

| | | | |
|---|---|---|---|
| 985,844 | 3/1911 | San | 209/632 X |
| 1,144,583 | 6/1915 | Rothert | 209/216 |
| 1,244,952 | 10/1917 | Bryan | 209/12 |
| 2,186,167 | 1/1940 | Eissmann | 209/37 |
| 2,721,656 | 10/1955 | Goodwin | 209/36 |
| 3,738,483 | 6/1973 | Mackenzie | 209/638 X |
| 3,865,241 | 2/1975 | Crow | 209/19 X |
| 3,888,351 | 6/1975 | Wilson | 209/930 X |
| 3,947,241 | 3/1976 | Caridis et al. | 432/121 |
| 3,970,546 | 7/1976 | Webb et al. | 209/12 X |
| 4,242,197 | 12/1980 | Voelskow et al. | 209/38 X |
| 4,376,042 | 3/1983 | Brown | 209/441 X |
| 4,522,344 | 6/1985 | Morey | 209/261 X |
| 4,728,045 | 3/1988 | Tomaszek | 209/12 X |
| 4,737,270 | 4/1988 | Phelps | 209/154 X |
| 4,755,284 | 7/1988 | Brooks | 209/20 |
| 4,778,061 | 10/1988 | Williams | 209/930 X |
| 4,804,148 | 2/1989 | Frei | 209/930 X |
| 4,865,720 | 9/1989 | Gilmore | 209/629 X |
| 4,929,342 | 5/1990 | Johnston | 209/12 |
| 5,025,929 | 6/1991 | Carrera | 209/32 |
| 5,074,992 | 12/1991 | Clinton | 209/12 |

FOREIGN PATENT DOCUMENTS

| | | | |
|---|---|---|---|
| 1038335 | 9/1978 | Canada | 209/36 |
| 191691 | 8/1986 | European Pat. Off. | 209/930 |
| 272624 | 6/1988 | European Pat. Off. | 209/443 |

OTHER PUBLICATIONS

Woodwaste tub grinder promotional material of Fuel Harvesters Equipment, Jul. 1987.

*Primary Examiner*—David H. Bollinger
*Attorney, Agent, or Firm*—Heller, Ehrman, White & McAuliffe

[57] ABSTRACT

A system for processing wastewood. The system may be mounted on a towable chassis. The wastewood is received at one end of the system and metal contaminants are removed from the wastewood. The wastewood is then separated according to size wherein a first size of wastewood is further processed by the system and a second size is removed from the system for subsequent re-processing. Unwanted paper and plastic contaminants are removed from the wastewood, and the wastewood of the first size is subjected to a further separating step wherein it is again separated according to size into usable end products.

21 Claims, 6 Drawing Sheets

WOODWASTE PROCESSING SYSTEM WITH CONTAMINATE SEPARATION

This a continuation of application Ser. No. 07/414,950 filed Sep. 29, 1989, now U.S. Pat. No. 5,074,992.

BACKGROUND OF THE INVENTION

The present invention relates generally to systems for recycling woodwaste, and more particularly, to an apparatus and method for separating contaminates from woodwaste to produce wood fuels and other usable products.

The forest products industry has been converting sawmill waste into a source of fuel for over a hundred years. According to current information, 80 percent of the total biomass residue converted to energy is derived from processing forest waste. Until recently, the term "biomass" referred to waste products of forest, agricultural, dairy, and animal products industries. With increased tipping fees at waste disposal sites (landfills) and a shortage of such sites in urban areas, there is an ever-increasing incentive to separate woodwaste from the urban waste stream, and to recycle it into a biomass boiler fuel and other usable products.

Based on recent data, 20 to 25 percent of all solid waste disposed of in urban areas is wood, or woody and fibrous organic material. This material is from discarded pallets, wood cratings, tree limbs, stumps, demolition waste, construction projects, and manufacturing industries. The vast majority of this material is transported to landfills for burial, adding to the nation's solid waste disposal crisis.

Burying woodwaste in landfills is not only a waste of a potential fuel, but is becoming an unmanageable problem in terms of finding adequate space for such landfills. It is difficult to document the amount of woodwaste being landfilled nationwide. However, in metropolitan New York alone, it is believed that about 10,000 tons per day are being landfilled. In addition to finding suitable landfill areas, landfilling is expensive, costing between $25.00 and $125.00 per ton. The environmental impact of landfilling is also just now being confronted through federal clean up and monitoring programs like the EPA Superfund. The simplest way to lessen the environmental impact is to decrease the amount of woodwaste going into landfills.

Of course, not all urban woodwaste can be economically separated from the waste stream, and some wood materials should not be utilized as fuel, as they may be contaminated with creosote, asbestos and/or formaldehyde. Even with these factors considered, recycling only 25 percent of the woodwaste that New York generates daily would provide 2,500 tons per day of biomass wood fuel. Providing a cost-effective way of separating this biomass fuel source from the waste stream should encourage the recycling of more woodwaste, decreasing the amount deposited in landfills and decreasing energy costs.

The technology to utilize woodwaste as a fuel is existing and fully commercialized in many areas. Plants such as Gaylord Container Company of Antioch, Calif. have been supplementing their woodwaste fuel with recycled urban woodwaste since the early 1980's, producing steam and 28 megawatts of electricity. At the present, in California alone, for example, there are at least 17 different facilities generating 205 megawatts of electricity utilizing a small percentage of recycled urban woodwaste as fuel.

Various equipment is currently on the market for processing wood and yard waste debris. For example, one such piece of equipment, sold by the assignee of the present invention, and known as the W.H.O Wood Waste Tub Grinder, can process wood and yardwaste six feet long and up to twelve inches in diameter at a rate of 10 to 25 tons per hour. Private companies and municipal public work departments utilizes these grinders to recycle woodwaste, and yardwaste into boiler fuel, landscaping products, soil amendments, and bulking agents.

However, there is a real need in the marketplace for equipment suited to screen and size woodwaste into a cleaner fuel. When marginal truckloads of wood fuel are turned away because the fuel does not meet the boiler plant's specifications, or a wood fuel supplier is restricted from processing available wood because of its dirt, metal, plastic, and/or yard waste content, the supplier's operating costs go up. Those costs must be covered, which, in turn, makes urban woodwaste less attractive as a fuel source. Additionally, higher operating costs limit others from entering the field.

Contaminated (marginal) woodwaste can be processed only if the contaminates can be efficiently and economically removed. If the contaminants are removed, the processed product that is unsuitable for fuel may still be marketable as landscaping products.

Woodfueled, biomass, electrical-generation facilities can burn fuel from in-forest residues, forest industry woodwaste and urban woodwaste. Of the three wood fuels, urban woodwaste rates the highest in BTU value and lowest in moisture content. Therefore, it burns at a higher efficiency than the other types of woodwastes. For instance, recycled urban wastewood has an energy content of 8,000 to 9,000 BTUs per pound and a moisture content of 10– . percent (wet basis). Harvested wood chips (in-forest residues) are rated at 6,000 BTUs per pound with a moisture content of about 35 to 45 percent (wet basis), and forest industry wastewood is rated about 7,500 BTUs per pound with a moisture content of between about 10 and 30 percent (wet basis). Thus, wastewood from the urban stream has a 30 percent higher energy content than in-forest residues and a 15 percent higher energy content than forest industry waste. As such, the use of urban woodwaste can provide increased efficiencies in electrical energy generation plants burning such material.

At present, it is thought that of the wood fuel types burned in boilers only about 3 percent is produced from urban woodwaste. If more of the higher BTU, urban woodwaste could meet wood fuel specifications, then the operating efficiencies and cost-effectiveness of these plants would improve. Thus, recycled urban woodwaste is the most valuable of any wood fuel product when it is screened of contaminates such as plastics, metals, dirt, and leaves as required by fuel buyers.

In addition to reducing the ever-increasing amounts of woodwaste that must be disposed of, recycling woodwaste into high-quality wood fuel should produce a decreased demand on non-renewable energy sources such as petrochemical products. The system of the present invention provides an economic and efficient way to tap an energy supply which has in the past been largely left untouched. It also provides an efficient way for producing marketable products other than fuel from contaminated woodwaste.

In view of the foregoing, it is an object of the present invention to provide a system capable of producing a less contaminated wood fuel from a wider source of woodwaste.

Another object of the present invention is to provide an economically-viable alternative to landfilling woodwaste.

Yet another object of the present invention is to provide high quality, marketable end products from urban woodwaste.

SUMMARY OF THE INVENTION

The present invention is directed to a system for processing wastewood. The system includes an input means for receiving the wastewood and means for removing metal from the wastewood. The metal may be removed from the wastewood in one or two stages. If the metal is to be recycled for resale, then, preferably, it is removed in two stages. The system further includes a separation means for receiving the wastewood from the metal removing means and for separating the wastewood according to size. The first size of the wastewood is further processed by the system of the present invention and the second size of the wastewood is removed from the system. The wastewood of the first size is transferred to a trommel means where it is further separated according to size. The system also includes means for removing plastic and/or paper material from the wastewood.

BRIEF DESCRIPTION OF THE DRAWINGS

FIG. 7 is a view along line 7—7 of FIG. 4.

FIG. 8 is a view along line 8—8 of FIG. 5.

DETAILED DESCRIPTION OF THE PREFERRED EMBODIMENT OF THE PRESENT INVENTION

Figure 1:
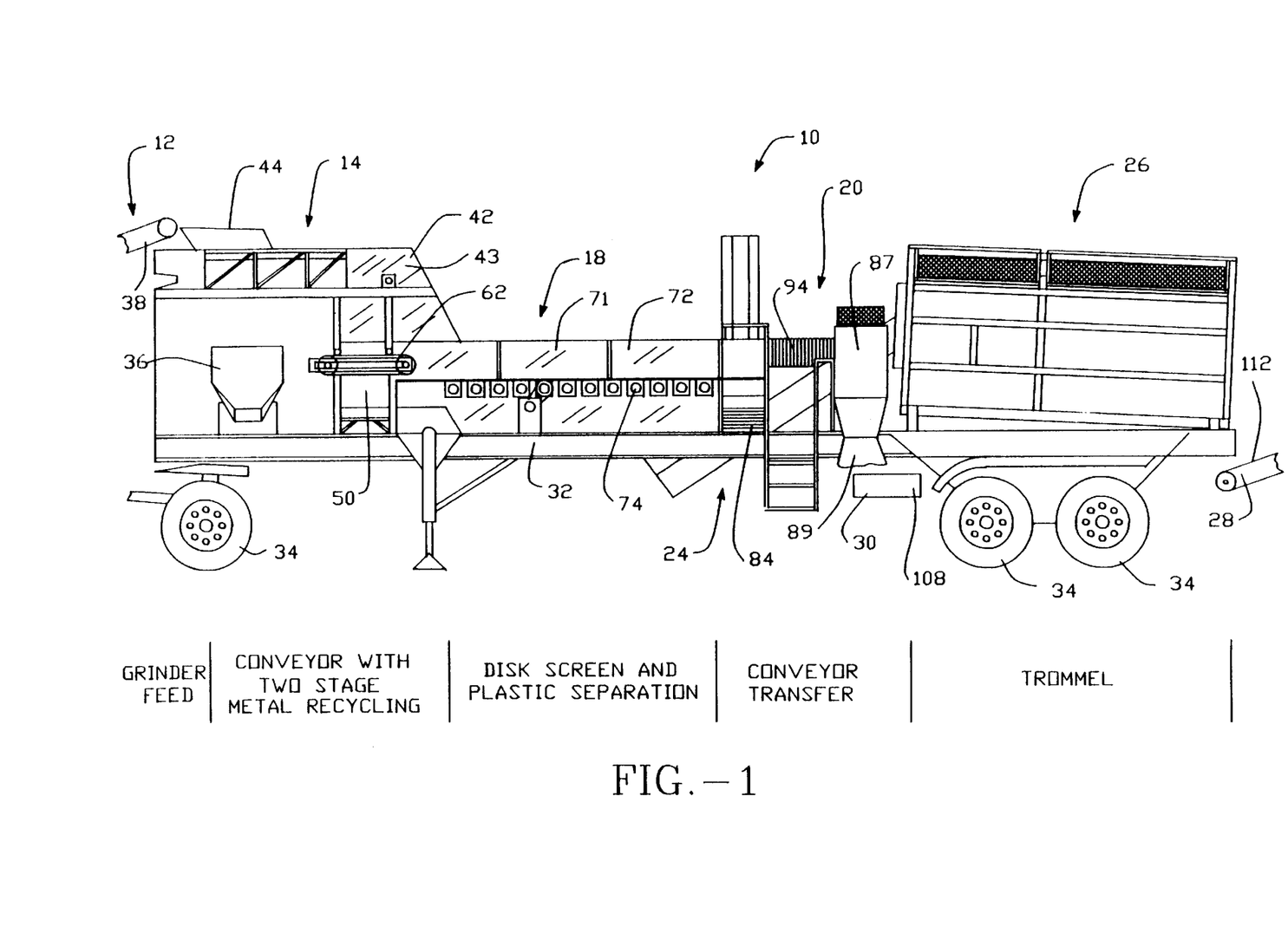
FIG. 1 is a front, schematic, elevational view of the apparatus of the present invention, showing the various stations and components.
Figure 2:
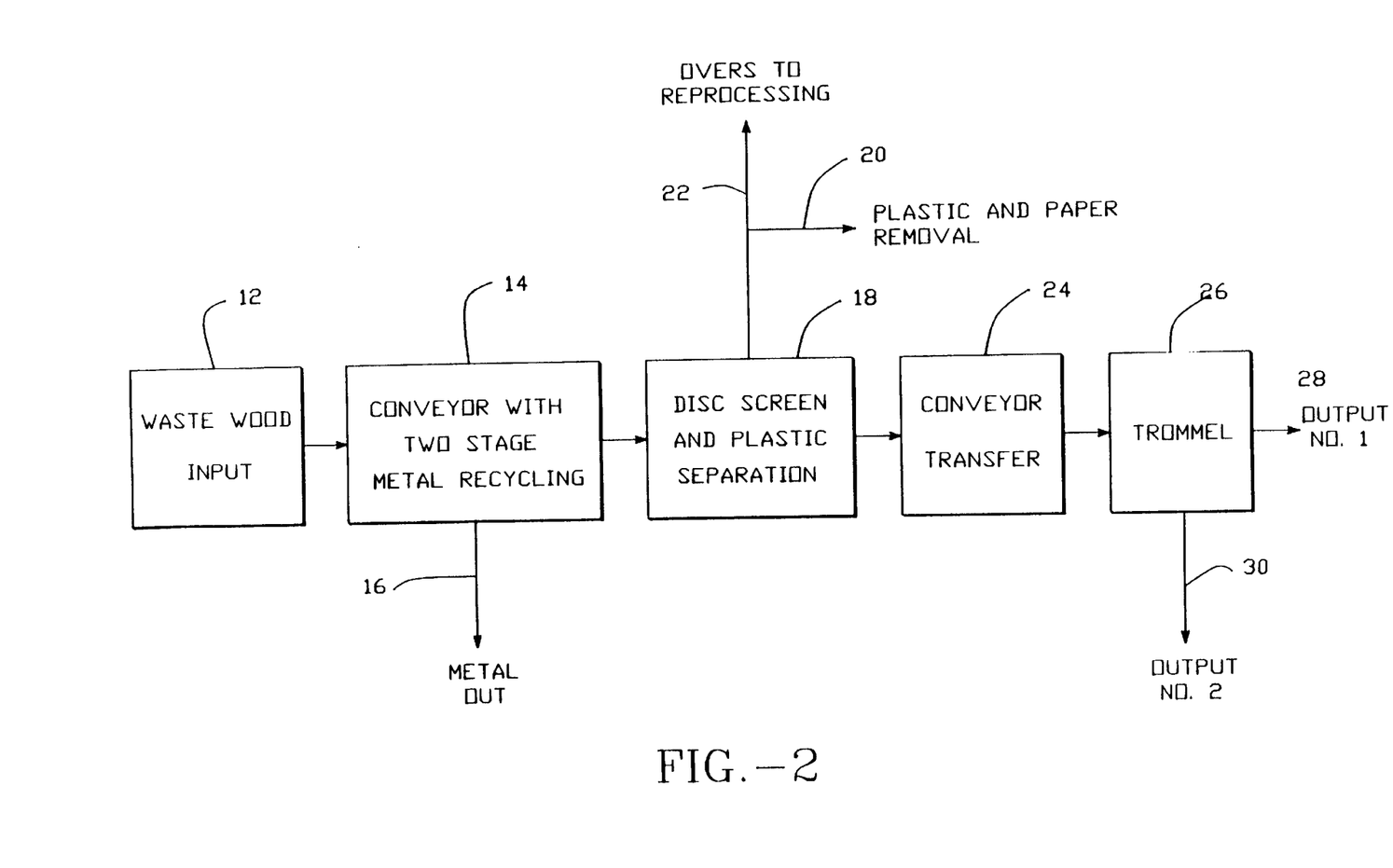
FIG. 2 is a flow diagram for the production of usable end products from woodwaste, using the apparatus and method of the present invention.

Referring now to the drawings, in which like components in the various figures are referred to by the same reference numerals, there is shown a preferred embodiment of the process and apparatus of the present invention. FIG. 1 shows the present invention incorporated in a portable apparatus 10 that may travel on roadways. The apparatus 10 is utilized to convert woodwaste into high-quality end products such as wood fuel, and landscaping and mulching products. FIG. 2 illustrates, for schematic purposes, the overall process of converting woodwaste into such high-quality end products, which includes the process of this invention as practiced by apparatus 10.

The process shown in FIG. 2 includes a loading or input step 12 wherein woodwaste after preferably being subjected to an initial grinding operation is fed into stage 14 of apparatus 10. Stage 14 includes a conveyer for moving woodwaste along the apparatus and equipment for separating ferrous metal from the woodwaste. The metal removed from the wood waste, as represented by reference number 16, may be recycled for resale. The woodwaste next moves onto a disc screen, and plastic and paper separation stage 18. At this stage, plastic and paper are removed from the woodwaste, as represented by reference number 20. Additionally, woodwaste in excess of about four inches in length (overs) is removed from the process line, as represented by reference number 22. The overs are collected for reprocessing, for example, by the grinder. From stage 18, the woodwaste, free of most plastic, paper and metal contaminants, and about one to four inches in length, is transferred by a conveyor 24 to a trommel 26. The trommel has two outputs 28 and 30. The number one output 28 consists of woodwaste ranging in size from approximately one to four inches. This wood waste is suitable for boiler fuel and mulch. The number two output 30 comprises woodwaste, less than an inch, and fines. This product may be used for landscaping and gardening products such as compost.

Figure 3:
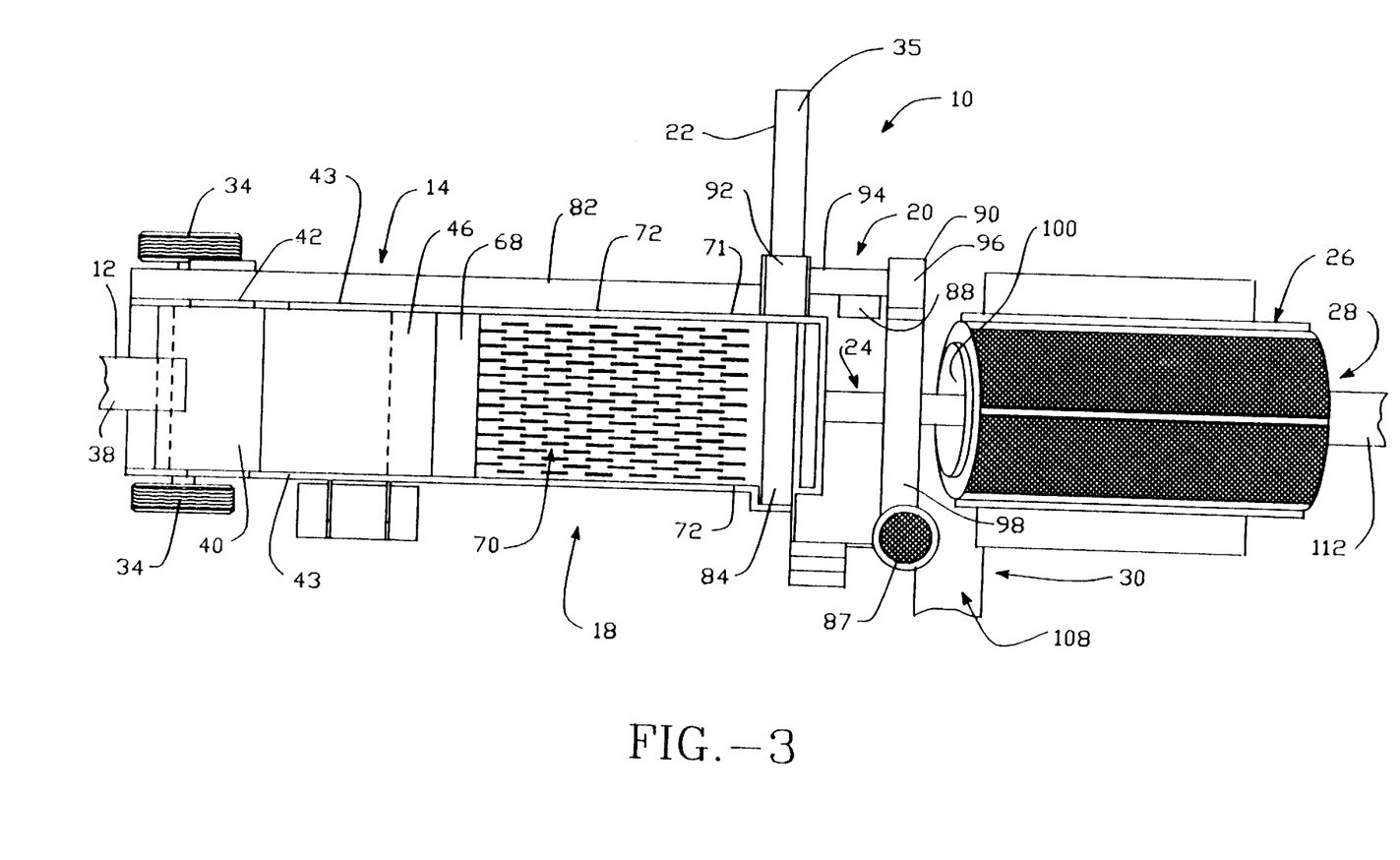
FIG. 3 is a plan view of FIG. 1.

As shown by FIGS. 1 and 3, the apparatus 10 of the present invention is mounted on a towable chassis 32. Thus, it is portable, and appropriately configured so that it may towed along the nation's highways. Specifically, the overall length and width of the chassis are approximately 10 and 50 feet, respectively. The height of the apparatus is about 13 feet. The chassis frame is constructed of high tensile steel, twelve inch structural channel of not less than twenty pounds per foot. The frame is a fifth wheel design suitable for towing. The suspension is tandem axles with leaf springs with a minimum capacity of 20,000 pounds each. Air brakes are provided and the tires 34 are preferably 10 by 22.5 tubeless. The engine 36 is a heavy-duty diesel air-cooled engine having a displacement of 374 cubic inches and a rated horsepower of 130 MP with all accessories attached. The engine is equipped with automatic emergency shutdown in case of low oil pressure or high coolant temperature. Also, as is well known in the art, the engine includes an hourmeter, ammeter, oil pressure indicators, and dry-type air filter element with centrifugal precleaner.

The powertrain for the various components of apparatus 10 is hydraulically operated. It is powered by multiple hydraulic pumps, hydraulic motors, sprockets, and chains. Sixteen hydraulic motors are utilized. All hydraulic systems operate well within pressure ratings of the hydraulic motors and have adjustable relief valves. All hydraulic systems incorporate flow adjustment valves for infinite control of operating speeds. The specifics of the hydraulic system are not discussed in detail since such systems are well known to those skilled in the art and may be suitably designed and constructed by those familiar with the principles of that art.

Referring again to FIG. 1, the feed 12 into the two-stage metal separation stage 14 may be from a W.H.O. Wood Waste Tub Grinder (not shown) that can process wood and yard waste up to six feet in length and 12 inches in diameter at a rate of 10 to 25 tons per hour. This material is fed from the tub grinder along a conveyor 38. The woodwaste on conveyor 38 ranges in size up to about six inches in any dimension. At this point, the woodwaste may also include contaminants such as metals, plastics, paper, and dirt. As will be discussed, subsequent processing in accordance with the present invention removes most, if not all, of these contaminants.

Material on conveyor 38 is fed to a conveyor 40 of stage 14. As can be best seen from FIGS. 1 and 4, endless conveyor 40 is located within a substantially rectangular-like shell portion 42 of this portion of apparatus 10 between the side walls 43 thereof. The top of shell portion 42 is open and an upwardly-extending input channel or hopper 44 is provided to facilitate transfer of the material, represented generally by reference numeral 45, from conveyor 38 to conveyor 40.

Figure 4:
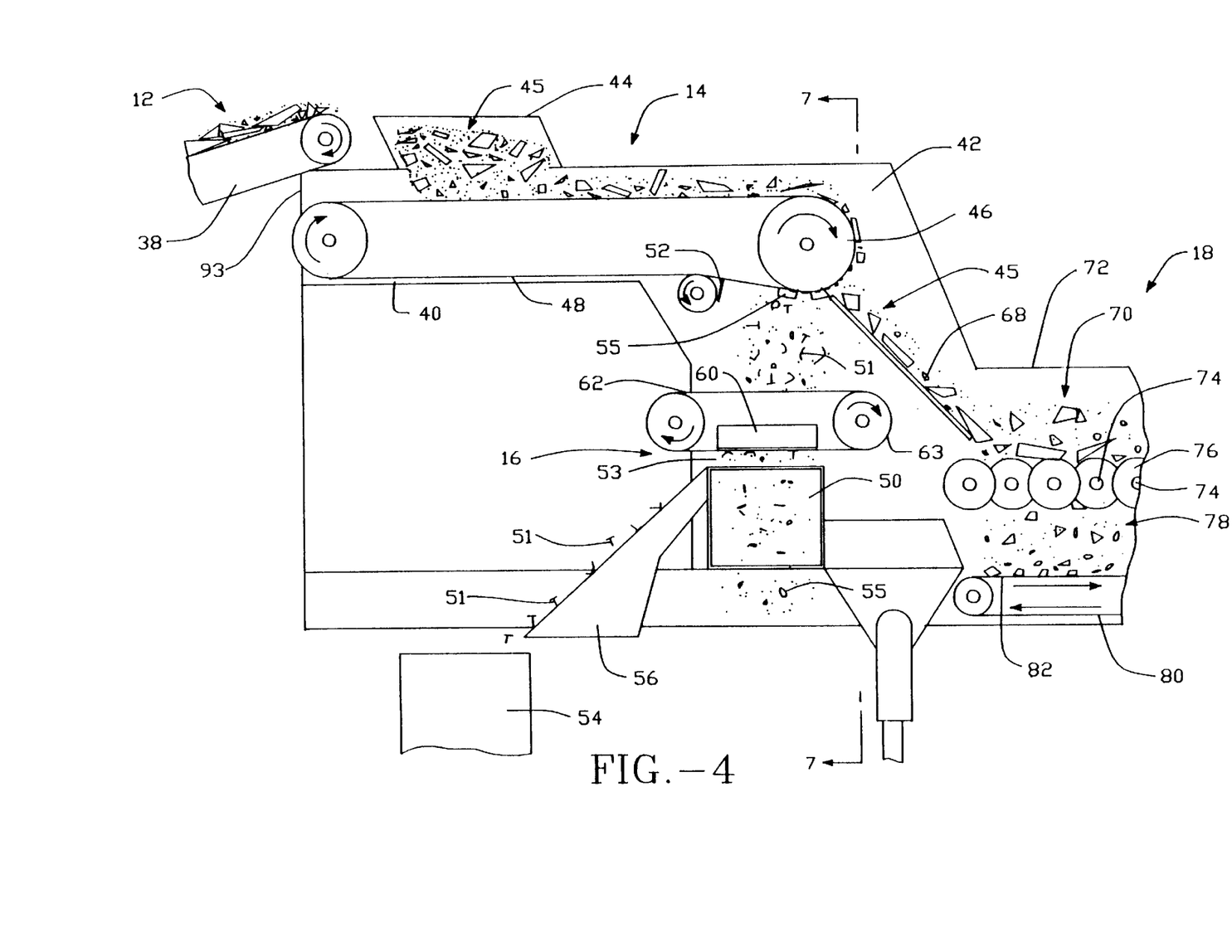
FIG. 4 is an enlarged schematic view of the apparatus of FIG. 1 showing the metal separation stage.

Conveyor 40 includes an endless conveyor belt 48 for carrying the wastewood through this stage of apparatus 10. The belt may be formed from PVC or rubber. Conveyor belt 48, like the other conveyor belts utilized in apparatus 10, may be driven by a hydraulic conveyor drive unit. The drive unit may include a variable speed reduction unit so that the speed of the conveyor belt is adjustable. The width of conveyor belt 48 is about 36 inches. Its normal operating speed is 100 feet per minute (fpm). Conveyor 40, like the other conveyors discussed below, is a flat pan design.

The head roller 46 of conveyor 40 is magnetic, and about 15 inches in diameter. The magnetic head 46 removes ferrous metal from the woodwaste 45 on conveyor belt 48. As schematically illustrated in FIGS. 4 and 7, metal 51 on conveyor belt 48 is removed from the woodwaste to drop onto a conveyor belt 53 of a second conveyor 50, which is disposed perpendicular to the longitudinal axes of chassis 32 and below conveyor 40. The woodwaste remaining on conveyor 40 proceeds to the disc screen and plastic/paper separation stage 18, as will be discussed below. A belt cleaning device 52 is provided to assist in removing metal 51 and any small amounts of wood chips and/or sawdust 55 stuck to conveyor belt 48. The belt cleaning device may consist of five plate metal wipers. The width of conveyor belt 53 is about 20 inches and its normal operating speed is about 50 fpm. The conveyor belt 53 has a PVC or rubber construction.

The magnetic head 46 of conveyor 40 will remove nearly all metal fragments from the woodwaste. Specifically, the woodwaste moving onto stage 18 will contain only about two to five percent of metal fragments. However, small amounts of wood chips and/or sawdust, as noted, stick to conveyor belt 48 and fall off with the metal fragments, especially during wet weather. As such the metal is too contaminated for resale. Thus, as discussed below, a second metal separation step may be provided. If it is not desired to recycle the metal for resale, then the second metal separation step may be eliminated and the metal, and any small amounts of wood and sawdust removed with it may be fed directly to a collection bin (not shown), located at the discharge end of 57 of conveyor belt 53. Alternatively, this material may simply be discharged onto the ground.

The secondary metal separation stage provides substantially complete separation of wood particles 55 from the metal 51. Secondary metal separation is provided by an overhead crossbelt magnet 60 and a conveyor 62 mounted across and above conveyor belt 53. The width of conveyor belt 63 is about 20 inches. It has a rubber construction, and normally travels at a speed of about 50 fpm. The overhead crossbelt magnet 62 is a permanent magnet. The magnet may be about 4 inches high by 14 inches wide by 30 inches long. The magnet is powerful enough to lift metal 51 off conveyor belt 53 and hold it on conveyor belt 63, until the metal moves out of the force field of the magnet at which point it falls off conveyor belt 63 into external metal receiving bin 54. A metal slide 56 may extend between conveyor belt 53 and collection bin 54 to ensure that metal 51 falls into bin 54. Also as shown, the remaining wood material 55 on conveyor belt 53 may be deposited on the ground. This material normally consists of small wood chips and sawdust.

Figure 5:
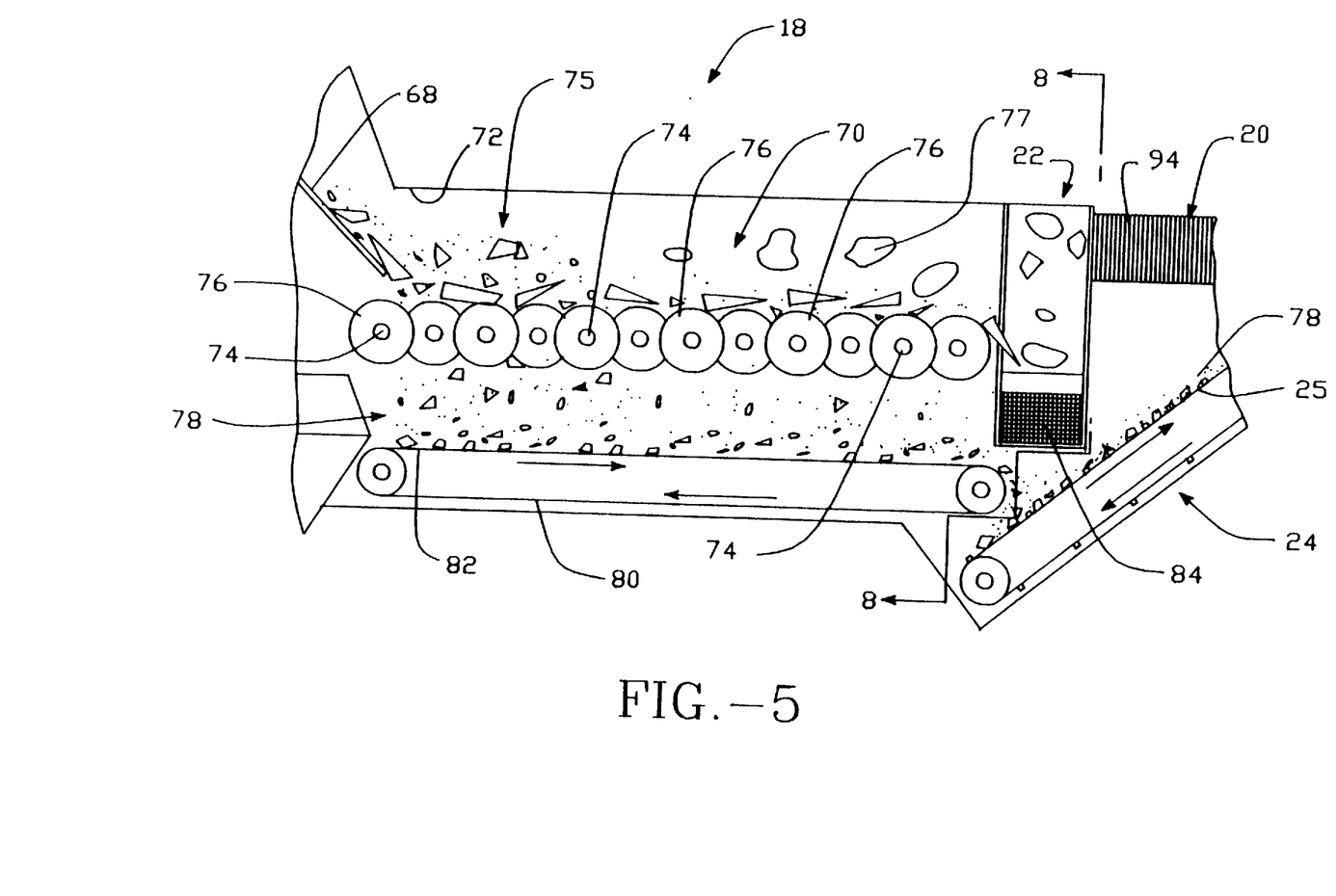
FIG. 5 is an enlarged schematic view of the apparatus of FIG. 1 showing the disc screen stage.

As can be seen from FIGS. 4–5 and 8, the woodwaste with most of the metal removed next proceeds to the disc screen and plastic and/or paper separation stage 18. More specifically, woodwaste 45 moves off conveyor 40 onto a slide or sloping metal surface 68, from where it slides onto the disc screen represented generally by reference number 70. Disc screen 70 is located generally in a rectangular-like portion 71 of apparatus 10, and is disposed below the side walls 72 of this portion of the apparatus, which may be open at the top. (See also FIG. 3).

The screen 70 is approximately 36 inches wide by 13 feet long. It is constructed of heavy gauge steel to prevent damage or jamming caused by the material moving through it. The screen comprises 12 rolling shafts 74 each having a diameter of about 2⁷⁄₁₆th of an inch. A series of discs or plates 76 are mounted on each shaft across the width of the screen. Approximately 10–24 discs are mounted on each shaft, and each disc is about 10 inches in diameter. These discs may have a star or flower petal shape to facilitate material separation. The shafts are driven by hydraulic motors through a chain and pulley arrangement. They rotate at about 100 revolutions per minute (rpm).

The screen 70 separates the woodwaste material according to size. The larger woodwaste material, called overs, about four inches or larger in any dimension, is removed from the process line for reprocessing, for example, in the grinder. The smaller material, less than about four inches in dimension, moves onto the final stage in the process. At this stage 18, plastic or paper contaminants are also removed from the woodwaste.

Particularly, the smaller material, represented generally by reference number 78, falls through screen 70 to be deposited onto a conveyor belt 82 of conveyor 80. The width of conveyor belt 82 is approximately 20 inches. It operates at a speed of about 200 fpm, and may be constructed of PVC.

The material 78 on conveyor belt 82 exists to the rear of the screen and onto a conveyor belt 25 of a thirteen foot long conveyor 24. From there, as discussed below, it is transferred to trommel 26.

As represented schematically in FIGS. 3 and 5, the larger material, represented generally by reference numeral 75, and plastic and/or paper material 77 travel along the upper surfaces of discs 76 of screen 70 to be discharged onto conveyor belt 86 of overs conveyor 84. The plastic and/or paper 77 are separated from the larger woodwaste material or overs 75. Thereafter, the overs move along conveyor 84 and onto conveyor 35 (See also FIG. 8) to be deposited at an appropriate collection bin or location from where they may be re-processed in the grinder for re-introduction into apparatus 10.

Conveyor 84 may have six inch high sides. Its conveyor belt 86 is about 20 inches wide and has an open wire mesh configuration to provide for plastic/paper removal as will be discussed. Conveyor 35 is of a similar size, but its belt is rubber or PVC rather than wire mesh. The discharge height of PVC rather than wire mesh. The discharge height of conveyor 35 is adjustable to 12 feet, and it and conveyor 84 normally operate at a speed of about 100 fpm.

Pieces of plastic bags and paper mixed in the woodwaste generally will render the end product unusable as fuel since burning plastic causes pollution. Also, the presence of too much plastic and paper in the end product will render it useless for applications such as landscaping. Although most plastic and paper may be removed before processing, some usually ends up in the product fed into the grinder. Thus, paper and plastic need to be removed from the woodwaste processed on apparatus 10. The apparatus of the present invention removes at least about 98 percent of all plastic and paper material from the woodwaste.

As best shown by FIGS. 1, 3, 5–6, and 8, the plastics and/or paper separation components include a cyclone 87, a blower 88, and a vacuum system 90. A 4 inch diameter pipe 37 (FIG. 8) extends from blower 88 to a position beneath conveyor belt 86. The end of the pipe opposite the blower is capped and the top surface of the pipe beneath the conveyor belt has a 1 by 20 inch slot, the width of the slot corresponding to the width of conveyor belt 86. The blower provides a charge air flow of approximately 1500 fpm through the 1 by 20 inch slot so as to lift paper and/or plastic material 77 from conveyor belt 86 into a hood 92, which is part of the vacuum system 90. As shown in FIG. 8, hood 92 is located above conveyor belt 86 in the region of the 1 by 20 inch slot. Specifically, the conveyor belt 86 extends through passageways 83 and 85 formed by the hood so that a confined space is provided above and below conveyor belt 86 to facilitate lifting of paper and plastic materials from the conveyor belt. Plastic and paper 77 are forced into the hood by the pressure generated by blower 88. A window (not shown) may be provided in the hood so that the lifting operation may be observed.

Figure 6:
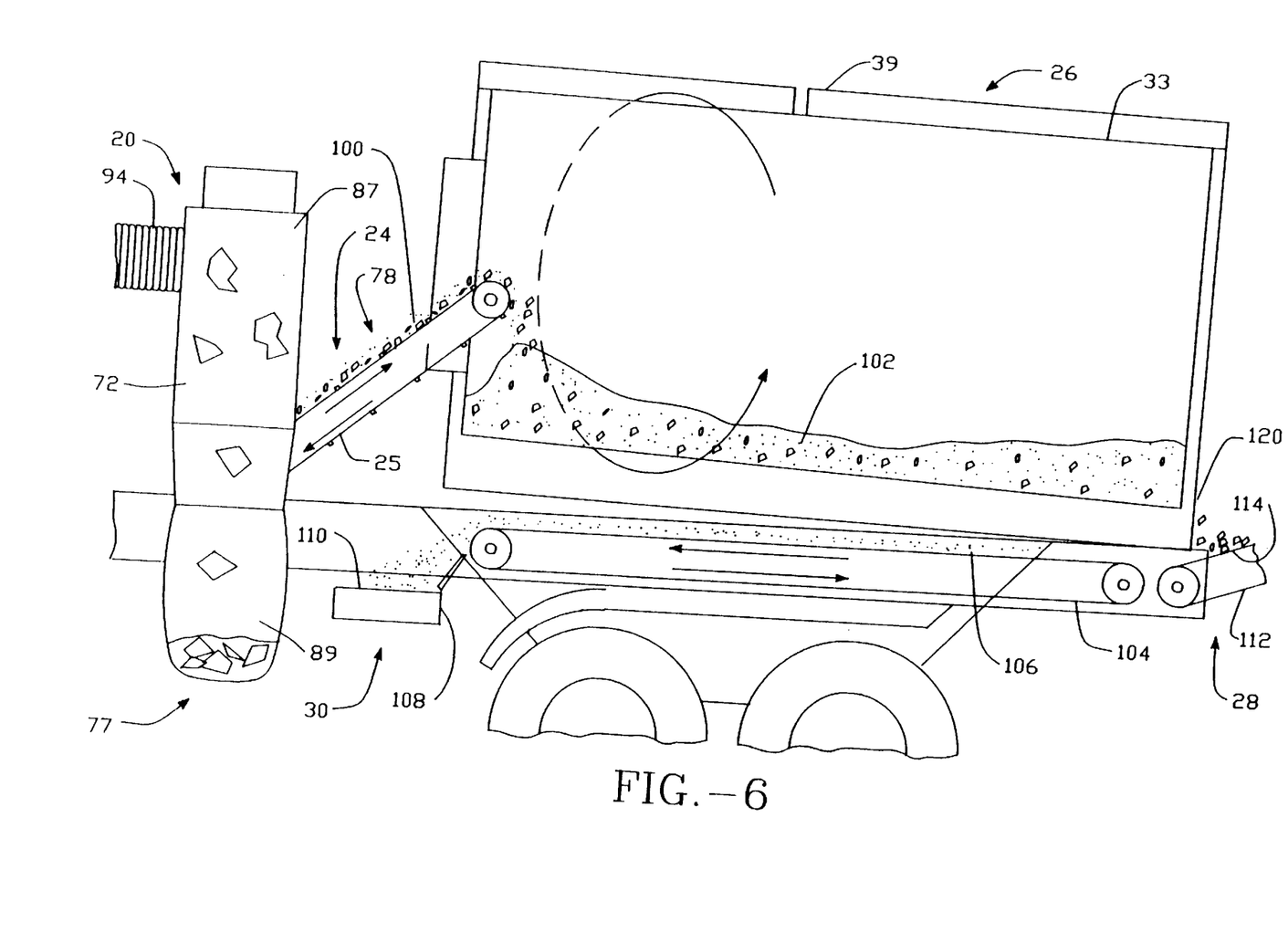
FIG. 6 is an enlarged schematic view of the apparatus of FIG. 1 showing a portion of the paper/plastic separation stage and the trommel stage.

From hood 92, the paper and/or plastic 77 is drawn through a flexible vacuum hose 94 by means of a vacuum created by vacuum fan 96. The vacuum fan is preferably a materials-handling fan, which generates a vacuum of about 5000 fpm through hose 94, which may have a diameter of about 13 inches. The vacuum fan withdraws the paper and plastic material through the hose 94 and then forces it through a duct 98, which may be about 12 by 14 inches in cross-section. The duct 98 is connected between vacuum fan 96 and cyclone 87. The cyclone is 3 feet in diameter and has preferably a cone shape. By its swirling action, it separates the air from the paper and plastic 77, and collects and then deposits the paper and plastic materials into a collection device, for example, a collection bag 89 located at the bottom of cyclone 87.

As previously noted, the woodwaste 78 is transferred from conveyor 82 (below disc screen 70) onto conveyor belt 25 of conveyor 24. Conveyor 24, as shown most clearly seen in FIGS. 1 and 5–6, is disposed at an angle from the horizontal to move material 78 from the rear of the disc screen 70 and from below chassis 32 to the inlet port or opening 100 of trommel 26. Conveyor 24 may have six inch high sides and a width of about 20 inches. It can operate at a speed of about 100 fpm, and its belt may be rubber or PVC.

The trommel 26 includes a cylindrical inner housing 33 disposed in an outer housing 39. The outer housing may have an open or closed construction. As is known in the art, the inner housing rotates within the outer housing on wheels (not shown) about its longitudinal axis at speeds ranging from between 5 and 25 rpms. The angle of inclination of the trommel may be varied by, for example, a hydraulic jack (not shown). Varying this angle will vary the speed of throughput of the trommel. The trommel is about 16 feet long, 13 feet high and has a diameter of about 6 feet.

A screen or series of screens 102 are formed inside the bottom of inner housing 33 of the trommel so that during rotation of the trommel sawdust, dirt and wood pieces less than about one inch in size fall through screen 102 to be deposited onto conveyor belt 106 of conveyor 104, which extends beneath and along the length of the trommel. Conveyor 104 transfers these materials onto conveyor belt 110 of conveyor 108. Conveyor 108 conveys the materials to an appropriate collection location. The material (output 30) on conveyor 104 is suitable for various uses such as compost and soil amendments.

The larger material, i.e. material one to four inches in size, exits the rear of the trommel at outlet port 120. There, it is deposited onto conveyor belt 114 of conveyor 112 to be transferred to a collection location. This material (output 28) may be used as boiler fuel as well as mulch from landscaping applications. It contains two percent or less dirt.

Conveyors 104, 108 and 112 are each about 20 inches wide, and may be operated at a speed of about 200 fpm. They may have rubber or PVC conveyor belts.

This system of the present invention is capable of removing metal, plastic and paper contaminants from shredded woodwaste. It also separates all woodwaste over four inches in dimension from the end product. The metal, plastic and paper contaminants, and processed end product materials exit the system in five different directions to allow for adequate product separation. The system can operate at a total flow rate of 25 tons per hour.

As can be seen from the above, the present invention comprises a unique apparatus and method for processing woodwaste into usable end products such as boiler fuels and landscaping materials. These end products may be utilized by landscapers, nurseries, sludge composting facilities, and wood fueled power plants. The processed woodwaste is free of all contaminants, such as ferrous metals, plastic and paper, and is appropriately sized for boiler applications.

The present invention has been described in terms of a preferred embodiment. The invention, however, is not limited to the embodiment depicted and described. Rather, the scope of the invention is defined by the appended claims.

What is claimed is:

1. An apparatus for processing wastewood, the wastewood including metal, plastic or paper material intermixed therewith, comprising:

input means for receiving the wastewood;

means for removing metal from the wastewood;

separation means for receiving the wastewood from said metal removing means and for separating the wastewood according to a first size and a second size of wastewood;

blower means for lifting plastic or paper material from the wastewood and vacuum means for capturing the plastic or paper material and for transferring it to a collection means; and means for transferring said first and second size of wastewood, and said plastic or paper material away from said separation means.

2. The apparatus of claim 1 wherein said input means includes a first conveyor means for transferring wastewood from an input feed to said separation means.

3. The apparatus of claim 2 wherein said metal removing means includes a magnetic head roller on said first conveyor means for separating metal from the wastewood.

4. The apparatus of claim 3 further including a second conveyor means proximate said first conveyor means for receiving and transferring metal separated from the wastewood by said magnetic head roller, and a third conveyor means proximate said second conveyor means and having associated therewith a magnetic means for removing metal from said second conveyor means, said metal removed thereby transported by said third conveyor means to a collection location.

5. The apparatus of claim 1 wherein said separation means comprises a plurality of rotatable shafts having disc means mounted thereon for supporting the wastewood of said second size and plastic or paper material wherein the wastewood of said first size falls between said disc means.

6. The apparatus of claim 1 wherein said means for transferring includes a first conveyor means having a pervious construction for transferring wastewood of said second size and plastic or paper material away from a discharge end of said separation means.

7. The apparatus of claim 6 wherein said blower means removes plastic or paper material from said first conveyor means with wastewood of second size being transferred to a location remote from the apparatus.

8. The apparatus of claim 7 wherein said collection means includes a cyclone means.

9. The apparatus of claim 6 wherein said vacuum means includes a hood means disposed above said first conveyor means and a vacuum fan connected to said hood means to establish a vacuum.

10. The apparatus of claim 1 located on a towable chassis.

11. An apparatus for processing wastewood, the wastewood including metal, plastic or paper intermixed therewith, comprising:

input means for receiving the wastewood;

means for removing metal from the wastewood;

separation means for receiving the wastewood from said metal removing means and for separating the wastewood according to size wherein a first size of wastewood is further processed by the apparatus and a second size of wastewood is removed from the apparatus, said separation means including a plurality of rotatable shafts having disc means mounted thereon for supporting the wastewood of said second size and plastic or paper material wherein the wastewood of said first size falls between said disc means;

a first conveyer means disposed below said disc means such that the wastewood of said first size falls onto said first conveyer means to be transferred from said separation means;

a second conveyor means of pervious construction for transferring the wastewood of said second size and plastic or paper away from a discharge end of said separation means; and blower means for lifting plastic or paper from the wastewood of said second size and vacuum means for capturing the plastic or paper and for transferring it to a collection location.

12. The apparatus of claim 11 wherein aid plastic or paper removing means removes plastic or paper from said second conveyor means wherein the wastewood of second size is transferred to a location remote from the apparatus.

13. The apparatus of claim 12 wherein said plastic or paper removing means includes a blower means for lifting plastic or paper from said second conveyor means and vacuum means for capturing the plastic or paper and transferring it to a collection means.

14. The apparatus of claim 13 wherein said vacuum means includes a hood means disposed above said second conveyor means and a vacuum fan connected to said hood means to establish a vacuum.

15. The apparatus of claim 13 wherein said collection means includes a cyclone.

16. The apparatus of claim 11 located on a towable chassis.

17. The apparatus of claim 11 wherein said metal removing means includes a first stage for separating the metal from the wastewood and a second stage for further separating the wastewood from the metal.

18. A method for processing wastewood, wherein the wastewood includes plastic or paper material intermixed therewith, comprising:

receiving the wastewood at an input of an apparatus;

separating the wastewood into a first size and a second size of wastewood;

removing plastic or paper material from the wastewood of said second size by lifting the plastic or paper material therefrom in a substantially vertical direction so it is suspended above the wastewood and then capturing the suspended plastic or paper material by vacuum action to transfer it to a collection means; and transferring the wastewood of said first and second sizes to a location remote from the apparatus.

19. The method of claim 18 wherein the wastewood includes metal and the metal is removed from the wastewood by magnetic means at a first location, the metal then being conveyed to a second location where it is again subjected to a magnetic force, and the metal then being conveyed to a third location away from the apparatus.

20. An apparatus for processing wastewood, the wastewood including plastic or paper intermixed therewith, comprising:

input means for receiving the wastewood;

separation means for receiving the wastewood from said input means and for separating the wastewood into a first size and a second size of wastewood;

conveyor means for transferring said first and second size of wastewood away from said separation means; and blower means disposed beneath said conveyor means for lifting plastic or paper mixed with the wastewood above said conveyor means and vacuum means disposed above said conveyor means for capturing the plastic or paper lifted from said conveyor means and for transferring it to a collection location.

21. An apparatus for processing wastewood, the wastewood including plastic or paper intermixed therewith, comprising:

input means for receiving the wastewood;

separation means for receiving the wastewood from said input means and for separating the wastewood into a first size and a second size;

a first conveyor means for transferring the wastewood of said first size away from said separation means;

a second conveyor means of pervious construction for transferring the wastewood of said second size and plastic or paper away from said separation means;

blower means disposed beneath said second conveyor means for lifting plastic or paper from said second conveyor means and vacuum means including a hood means disposed above said second conveyor means for capturing the plastic or paper lifted from said second conveyor means and for transferring it to a collection location.

* * * * *